United States Patent [19]

Sakashita et al.

[11] 4,189,548

[45] Feb. 19, 1980

[54] EPOXY RESIN COMPOSITION

[75] Inventors: Takeshi Sakashita, Iwakuni; Ryoichi Miyamoto, Ohtake, both of Japan

[73] Assignee: Mitsui Petrochemical Industries, Ltd., Tokyo, Japan

[21] Appl. No.: 899,967

[22] Filed: Apr. 25, 1978

[30] Foreign Application Priority Data

Sep. 13, 1977 [JP] Japan ................................. 52-109419

[51] Int. Cl.$^2$ ............................................. C08L 63/00
[52] U.S. Cl. ................................. 525/109; 260/42.28; 526/237; 526/283; 525/122
[58] Field of Search ............................. 260/836, 837 R

[56] References Cited

U.S. PATENT DOCUMENTS

| | | | |
|---|---|---|---|
| 3,057,614 | 10/1962 | Greenlee | 260/837 R |
| 3,069,373 | 12/1962 | Greenlee | 260/837 R |
| 3,420,915 | 1/1969 | Braithwaite | 260/837 R |
| 3,753,963 | 8/1973 | Hayashi | 260/836 |
| 4,003,959 | 1/1977 | Wada | 260/837 R |
| 4,012,858 | 3/1977 | Wada | 260/837 R |

Primary Examiner—Paul Lieberman
Attorney, Agent, or Firm—Wenderoth, Lind & Ponack

[57] ABSTRACT

An epoxy resin composition comprising
[A] a novel copolymer produced by polymerizing a polymerizable material selected from the group consisting of
(a) substituted or unsubstituted dicyclopentadiene;
(b) a cationically polymerizable unsaturated hydrocarbon-containing fraction obtained by distilling a cracking or reforming product of a petroleum and having a boiling point in the range of −20° C. to 280° C.;
(c) a cationically polymerizable vinyl aromatic hydrocarbon having 8 to 10 carbon atoms;
(d) a mixture of two or three of ingredients (a), (b) and (c); and
(e) a mixture of any one of ingredients (a) to (d) with a cationically polymerizable unsaturated aliphatic hydrocarbon having 4 to 10 carbon atoms in the presence of a cationic polymerization catalyst with a high-boiling product having a boiling point of at least about 150° C. and an oxygen content of at least 0.5% by weight being introduced into the polymerization system at any stage of the polymerization process or into the resulting polymer, the said high-boiling product being obtained as a by-product in a process comprising oxidizing a benzene or naphthalene ring-substituted with at least one isopropyl group to convert it to the corresponding hydroperoxide and then decomposing it with an acid to produce the corresponding phenol or naphthol;
[B] a polyepoxy compound; and
[C] a curing agent.

This epoxy resin composition is useful for paints, adhesives, road-repairing materials, floor coverings, etc.

31 Claims, No Drawings

EPOXY RESIN COMPOSITION

This invention relates to a novel polymer. More specifically, it relates to a method for preparing a novel modified hydrocarbon polymer, and the use of the novel polymer as a substitute for a tar resin in a tar-containing resin composition, such as a tar epoxy resin composition or a tar urethane resin composition, especially the former, which finds extensive use as paints, adhesives, road-repairing materials, floor coverings, etc.

The epoxy resin compositions comprising a polyepoxy compound, tar, a curing agent and optional additives such as pigments, fillers, reactive diluents, flexibilizer or modifying resins and tar urethane resin compositions comprising a urethane prepolymer, tar, a curing agent and optional additives such as pigments, fillers, flexibilizers and modifying resins are generally inexpensive and have relatively good adhesion, chemical resistance and flexibility. Hence, they find extensive use as water-proof coatings of buildings and surface protective paints for metallic containers, various industrial apparatus and appliances, steel, pipes, ships, seaside facilities and structural materials; as adhesives for floors, bricks, tiles; as road repairing materials for repairing cracks in highways; and as floor coverings for slip prevention, waterproofing, etc.

However, these tar epoxy resin compositions and tar urethane resin compositions have one or more defects. For example, because the tar components present in a concentration of about 10 to 50% by weight such as coal tar, pitch and petroleum asphalt contain carcinogenic substances such as benzopyrene, they represent health hazard at the time of preparation and application of these compositions. Or they tend to bleed out from the compositions because their compatibility with polyepoxy compounds or urethane prepolymers is generally not good. Since they are black in color, pale-colored coatings cannot be obtained, and their use is limited.

In an attempt to eliminate these defects, various investigations have been made for techniques of replacing the tar components of the tar epoxy resin compositions and tar urethane resin compositions by substances which have characteristics comparable to, or better than, those of the conventional tar components, and some of the results obtained have been reported, and applied for patent.

For example, Japanese Pat. No. 23718/75 suggests the use of the by-product cresol distillation residue obtained in the synthesis of cresol as a substitute for the tar component of a tar epoxy resin composition composed mainly of an epoxy resin, a curing agent and the tar component. Japanese Pat. Nos. 10847/76 and 29185/76 disclose the use of cresol distillation residue formed in the synthesis of cresol as a substitute for the tar component of the tar urethane resin composition. Japanese Pat. Nos. 3487/76 and 24364/76 disclose tar urethane compositions for coating which comprise the reaction product of tar and formaldehyde obtained as a by-product in the synthesis of cymene-process cresol or the reaction product of tar and formaldehyde obtained as a by-product in the synthesis of phenol by the cumene process or in the synthesis of resorcinol and hydroquinone from di-isopropylbenzene, in conjunction with a polyisocyanate and a curing agent.

The distillation residue (tar) formed as a byproduct in the synthesis of phenols such as phenol, cresol, resorcinol and hydroquinone suggested in these Japanese Pats. from the corresponding mono- or di-isopropylbenzenes, or the reaction products of them with formaldehyde have good compatibility with the remaining ingredients of the tar epoxy resin compositions or tar urethane resin compositions, such as epoxy resins, urethane prepolymers or polyisocyanates. However, since these distillation residues or reaction products are highly reactive with the polyepoxy compounds, urethane prepolymers and polyisocyanates, tar epoxy resin compositions and tar urethane resin compositions containing these distillation residues or reaction products have the defect of reduced operability because of their short curing time, and give coatings having poor water resistance.

It is an object of this invention therefore to provide a method for preparing a modified hydrocarbon polymer having superior compatibility with polyepoxy compounds, polyisocyanate compounds and urethane prepolymers.

Another object of this invention is to provide a method for preparing a novel modified hydrocarbon polymer which exhibits superior performance as a substitute for the tar components in conventional tar epoxy resin compositions or tar urethane resin compositions.

Still another object of this invention is to provide the use of the novel modified hydrocarbon polymer as a tar component in tar epoxy resin compositions or tar urethane resin compositions.

A further object of this invention is to provide an epoxy resin composition having superior thermal stability, water resistance and chemical resistance, which contains the novel modified hydrocarbon polymer.

Other objects and advantages of the invention will become apparent from the following description.

According to the invention, for which an application was filed by Ryoichi Miyamoto et al. on the same day as the present one under Ser. No. 899,966, there is provided a method for preparing a novel polymer which comprises polymerizing a polymerizable material selected from the group consisting of (a) substituted or unsubstituted dicylopentadiene,
(b) a cationically polymerizable unsaturated hydrocarbon-containing fraction obtained by distilling a cracking or reforming product of a petroleum and having a boiling point in the range of $-20°$ C. to $280°$ C.,
(c) a cationically polymerizable vinyl aromatic hydrocarbon having 8 to 10 carbon atoms,
(d) a mixture of two or three of ingredients (a), (b) and (c), and
(e) a mixture of any one of ingredients (a) to (d) with a cationically polymerizable unsaturated aliphatic hydrocarbon having 4 to 10 carbon atoms in the presence of a cationic polymerization catalyst; wherein a high-boiling product having a boiling point of at least about $150°$ C. and an oxygen content of at least 0.5% by weight is introduced at any stage of the polymerization process into the polymerization system or into the resulting polymer, the said high-boiling product being obtained as a by-product in a process comprising oxidizing a benzene or naphthalene ring-substituted with at least one isopropyl group to convert it to the corresponding hydroperoxide and then decomposing it with an acid to produce the corresponding phenol or naphthol.

The characteristic feature of the method of this invention is that the hydrocarbon polymer produced by polymerizing any of the polymerizable materials (a) to (e) is modified with the specified high-boiling product.

The polymerizable materials (a) to (e) used in the present invention will be described below more specifically.

(a) Substituted or unsubstituted dicyclopentadiene

The dicyclopentadienes used in the present invention can be expressed by the following formula

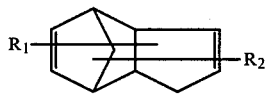 (I)

wherein $R_1$ and $R_2$, independently from each other, represent a hydrogen atom or a lower alkyl group.

In the present application, the term "lower" means that groups modified by this term have up to 5, preferably up to 3, carbon atoms. The lower alkyl group may be linear or branched, and includes, for example, methyl, ethyl, n- or iso-propyl, n-, iso-, sec- or tert-butyl.

Typical examples of the dicyclopentadiene of formula (I) are dicyclopentadiene, methyldicyclopentadiene, and dimethylcyclopentadiene.

These dicyclopentadienes can be used either singly or as a mixture of two or more. Of these, dicyclopentadiene, methyldicyclopentadiene and dimethyldicyclopentadiene are especially preferred in the present invention.

These dicyclopentadienes may, of course, be used in purified form. But this is not always necessary, and they may be in the crude state according to the method of preparation. For example, the dicyclopentadienes can be produced by heating to 80° to 200° C. a cyclopentadiene-containing fraction having a boiling point in the range of 20° to 100° C. and obtained by distilling the cracking or reforming products of petroleums, to thermally dimerize these cyclopentadienes. The starting fraction having a boiling range of 20° to 100° C. contains cyclopentadienes in an amount of generally 0.2 to 40% by weight, preferably 0.5 to 30% by weight, although the amount may vary according to the type of the petroleums. This thermal dimerization gives a reaction mixture containing dicyclopentadienes formed in a concentration of usually 0.5 to 50% by weight, preferably 1 to 40% by weight. The reaction mixture can be used directly as the polymerizable material (a) in accordance with the present invention. Preferably, however, the reaction mixture is distilled to remove at least part of the low boiling components, and the resulting fraction containing at least 35% by weight, preferably at least 40% by weight, especially preferably at least 60% by weight, of the dicyclopentadienes can be used as the polymerization material (a).

Components other than the dicyclopentadienes in the reaction mixture or fraction are not limited in particular. They may contain other unsaturated hydrocarbons, or as diluents, saturated hydrocarbons such as n-butane, iso-butane, n-pentane, iso-pentane, heptane, benzene, toluene, xylene, cumene, and cymene.

(b) Cationically polymerizable unsaturated hydrocarbon-containing fraction having a boiling range of −20° to 280° C. which is obtained by distilling the cracking or reforming product of a petroleum In the present application, the term "petroleum" denotes naphtha, gas oils or kerosene.

The term "fraction obtained by distilling the cracking or reforming product of a petroleum" denotes a hydrocarbon-containing fraction which is formed as a by-product in the thermal or catalytic cracking, such as stream cracking, vapor phase cracking or sand cracking or reforming, such as hydroreforming, of the petroleum defined above.

As the polymerizable material (b) in accordance with this invention, a cationically polymerizable unsaturated hydrocarbon-containing fraction which has a boiling range of −20° C. to +280° C. is specifically used.

The types and contents of hydrocarbons present in all distillates having a boiling range from −20° C. to +280° C. vary greatly according to the types of the petroleum used in the production of the fraction, and cannot be accurately determined. Generally, the resulting fraction consists of a fraction consisting mainly or composed mainly of $C_4$–$C_5$ unsaturated aliphatic hydrocarbons having a boiling point in the range of −20° C. to 30φ° C. [to be referred to as a $C_{4-5}$ fraction], a fraction consisting mainly of toluene and xylene having a boiling point in the range of 100° C. to 140° C. [to be referred to as a TX fraction], and a fraction consisting mainly of $C_8$–$C_{12}$ aromatic unsaturated hydrocarbons [to be referred to as a $C_{8-12}$ fraction].

Roughly, the amount of the $C_{4-5}$ fraction is about 20 to 70% by weight, the amount of the TX fraction is about 20 to 60% by weight and the amount of the $C_{8-12}$ fraction is about 5 to 40% by weight, based on the weight of the entire fractions.

The term "aromatic unsaturated hydrocarbon", as used herein, denotes a hydrocarbon containing at least one aromatic ring and at least one cationically polymerizable unsaturated bond.

In the method of this invention, the fraction having a broad boiling range of −20° C. to +280° C. can be used directly. The typical constituents of this fraction and their proportions are shown in Table I.

Table I

| Components | Content (%) |
|---|---|
| 1-Butene | 3.0–9.0 |
| Isobutylene | 4.0–11.0 |
| 2-Butene | 0–5.0 |
| 1,3-Butadiene | 6.0–15.0 |
| Butane | 0–3.0 |
| n-Pentane | 1.5–6.0 |
| Isoprene | 0.5–5.0 |
| Cyclopentadiene | 0.5–5.0 |
| $C_5$ olefin | 0–10.0 |
| Benzene | 15.0–35.0 |
| Toluene | 10.0–20.0 |
| Vinyltoluene | 0.5–4.0 |
| Indene | 0.5–4.0 |
| Styrene, α-methylstyrene, methylindene and β-methyl styrene | 0.1–5.0 |
| $C_{8-12}$ non-polymerizable aromatic saturated hydrocarbon | 0.1–10.0 |

Advantageously, however, the $C_{4-5}$ fraction, the $C_{8-12}$ fraction, or a mixture of these is used. Accordingly, the $C_{4-5}$ fraction and $C_{8-12}$ fraction will be described in more detail below.

As stated, the $C_{4-5}$ fraction contains $C_4$ unsaturated aliphatic hydrocarbons such as $C_4$ olefins and $C_4$ diolefins and $C_5$ unsaturated aliphatic hydrocarbons such as $C_5$ olefins and $C_5$ diolefins as major components and paraffin and benzene as minor components. $C_{4-5}$ fractions that can be advantageously used in the present invention typically have the compositon shown in Table II.

Table II

| Components | Content (wt. %) |
| --- | --- |
| $C_4$ olefins | 20–50 (25–45) |
| $C_4$ diolefins | 5–35 (10–30) |
| $C_5$ olefins | 2–30 (5–20) |
| $C_5$ diolefins | 2–30 (5–20) |
| Paraffins | 20–60 (30–50) |
| Benzene and others | 0–10 (0–5) |

The parenthesized figures show preferred ranges, and this will apply to all Tables appearing hereinbelow.

Examples of $C_4$ olefins are 1-butene, 2-butene and isobutene. An example of $C_4$ diolefin is 1,3-butadiene. Examples of $C_5$ olefins are 1-pentene, 2-pentane, cyclopentene, 2-methyl-1-butene, and 2-methyl-2-butene. Examples of $C_5$ diolefins include 1,3-pentadiene, isoprene and cyclopentadiene. The paraffins include, for example, n-butane, isobutane, n-pentane, isopentane, and cyclopentane. The other components are, for example, $C_6$ and $C_7$ aliphatic hydrocarbons such as methylcyclopentadiene, 1-hexene, n-hexane, 3-methylpentane and 2,2-dimethylbutane.

The $C_{4-5}$ fraction having a boiling range of $-20°$ C. to $+100°$ C. can be directly used. Or a fraction consisting mainly of $C_5$-unsaturated hydrocarbons such as $C_5$ olefins and $C_5$ diolefins and having a boiling range of $+20°$ to $+100°$ C. which is obtained by distilling the $C_{4-5}$ fraction can also be used as the $C_{4-5}$ fraction. An example of a preferred composition of the fraction having a boiling range of $+20°$ to $+100°$ C. is shown in Table III.

Table III

| Components | Content (% by weight) |
| --- | --- |
| $C_4$ olefins } $C_4$ diolefins } $C_5$ olefins | 0.1–5 (0.5–3) |
| $C_5$ diolefins | 10–60 (20–50) |
| Paraffins and others | 10–60 (20–50) |
|  | 20–50 (15–45) |

The $C_{8-12}$ fraction that can be used favorably in the present invention contains cationically polymerizable $C_8$–$C_{12}$ aromatic unsaturated hydrocarbons as major ingredients and olefins, diolefins, non-polymerizable aromatic saturated hydrocarbons, paraffins and naphthenes as minor ingredients. A typical composition of the $C_{8-12}$ fraction that can be used in this invention is shown in Table IV.

Table IV

| Components | Content (% by weight) |
| --- | --- |
| $C_{8-12}$ aromatic unsaturated hydrocarbons | 25–75 (30–60) |
| Olefins | 0–15 (1–10) |
| Diolefins | 0–5 (1–3) |
| Non-polymerizable aromatic saturated hydrocarbons | 15–50 (20–40) |
| Paraffins and naphthenes | 0–25 (5–25) |

Examples of the $C_8$–$C_{12}$ aromatic unsaturated hydrocarbons contained in the $C_{8-12}$ fraction are styrene, α- or β-methylstyrene, o-, m- or p-vinyltoluene, indene, methylindene, and vinyl naphthalene. Usually, $C_9$–$C_{10}$ aromatic unsaturated hydrocarbons such as α- or β-methylstyrene, o-, m- or p-vinyltoluene, indene and methylindene account for 50 to 95% by weight, usually 60 to 95% by weight, of the $C_8$–$C_{12}$ aromatic unsaturated hydrocarbons. Usually, $C_8$ aromatic unsaturated hydrocarbons such as styrene, and $C_{11}$–$C_{12}$ aromatic unsaturated hydrocarbons are contained in an amount of 1 to 30% by weight, especially 2 to 20% by weight, and 1 to 40% by weight, especially 2 to 30% by weight, respectively.

Examples of the olefins and diolefins that can be contained in the $C_8$–$C_{12}$ fraction are $C_8$–$C_{12}$ olefins and diolefins such as dicyclopentadiene or methyldicyclopentadiene. Typical examples of the non-polymerizable aromatic saturated hydrocarbons contained in the $C_8$–$C_{12}$ fraction include $C_8$–$C_{12}$ aromatic saturated hydrocarbons such as xylene, ethylbenzene, cumene, ethyltoluene, n-propylbenzene, trimethylbenzene, indane, methylindane, naphthalene, methylnaphthalene and dimethylnaphthalene.

The paraffins and naphthenes contained in the $C_{8-12}$ fraction include $C_9$ to $C_{12}$ paraffins and naphthenes.

The cationically polymerizable aromatic unsaturated hydrocarbon component in the $C_{8-12}$ fraction typically consist essentially of the components shown in Table V.

Table V

| Components | Amount (% by weight)* | |
| --- | --- | --- |
| Vinyltoluene } Indene } Styrene | Total | 30 to 85 (35 to 70) |
| α-Methylstyrene } Methylindene } β-Methylstyrene | Total | 5 to 50 (15 to 40) |

*The amounts are based on the total weight of the cationically polymerizable aromatic unsaturated hydrocarbons.

The $C_{8-12}$ fraction described above can be directly used, or as required, it may be purified prior to use by, for example, distilling it to separate at least part of the non-polymerizable hydrocarbons and to increase the content of the cationically polymerizable aromatic unsaturated hydrocarbons. In particular, a $C_{8-12}$ fraction having a boiling range of 140° to 220° C. is preferred.

The $C_{4-5}$ fraction and the $C_{8-12}$ fraction can be used singly or if desired, as a mixture. When they are used as a mixture, the mixing ratio between them is not critical, and can be varied over a wide range. Generally, it is advantageous to mix them so that the weight ratio of the $C_{4-5}$ fraction to the $C_{8-12}$ fraction is within the range of 1:99 to 90:10, preferably 1:99 to 80:20.

(c) Cationically polymerizable vinyl aromatic hydrocarbon having 8 to 10 carbon atoms The fraction described in (b) above contains two or more cationically polymerizable vinyl aromatic hydrocarbons having 8 to 10 carbon atoms (to be referred to as $C_{8-10}$ vinyl aromatics) in the mixed state. In the present invention, however, the $C_{8-10}$ vinyl aromatics can be used also in the isolated state.

Examples of such $C_{8-10}$ vinyl aromatics are styrene, α- or β-methylstyrene, o-, m- or p-vinyltoluene, o-, m-, or p-isopropyltoluene, indene, o-, m-, or p-ethylstyrene, and 3-methylindene. Of these, styrene, α- or β-methylstyrene, o-, m-, or p-vinyltoluene, and o-, m-, or p-isopropenyltoluene are preferred. They can be used either alone or as a mixture of two or more.

(d) Mixture of two or more of the ingredients (a), (b) and (c)

In a mixture of ingredients (a) and (b); ingredients (a) and (c); ingredients (b) and (c); or ingredients (a), (b) and (c), the mixing proportions are not strictly limited, and can be varied widely according to the types of these ingredients (a), (b) and (c), etc. Generally, the use of the following proportions is generally recommendable.

| Mixtures | Weight ratio |
| --- | --- |
| (a)/(b) | 10/90 to 90/10 (especially 20/80 to 80/20) |
| (a)/(c) | 50/50 to 98/2 (especially 60/40 to 95/5) |
| (b)/(c) | 50/50 to 98/2 (especially 60/40 to 95/5) |
| (a)/(b)/(c) | 10 to 60/ 40 to 90/ 1 to 30 (especially 15 to 50/ 45 to 83/ 5 to 20) |

(e) Mixture of any one of the ingredients (a) to (d) with a cationically polymerizable unsaturated aliphatic hydrocarbon having 4 to 10 carbon atoms The ingredients (a) to (d) can be used also as a mixture with a cationically polymerizable unsaturated aliphatic hydrocarbon having 4 to 10 carbon atoms (to be referred to hereinbelow as $C_{4-10}$ aliphatic hydrocarbon).

Any $C_4-C_{10}$ aliphatic hydrocarbons which are copolymerizable with the ingredients (a) to (d) under the polymerization conditions to be described can be used. Aliphatic hydrocarbons having 4 to 8 carbon atoms are preferred. Specific examples of such $C_{4-10}$ aliphatic hydrocarbons include butadiene, isoprene, piperylene, isobutylene, 1-butene, 2-butene, 2-methyl-1-butene, 2-methyl-2-butene, 1-pentene, 2-pentene, cyclopentene, 2,3,3-, 2,3,4-, or 3,3,4-trimethylpentene-1, and 2,3,4-trimethylpentene-2. Of these, butadiene, isobutylene, isoprene, piperylene and 2-butene are especially preferred. They can be used either singly, or if required, as a mixture of two or more.

The proportion of the $C_{4-10}$ aliphatic hydrocarbon to be mixed with any of the ingredients (a) to (d) is not particularly restricted, and can be varied widely. Generally, however, the $C_{4-10}$ aliphatic hydrocarbon should not be used in too large an amount, and it is advantageous to use it in an amount of at most 80% by weight, preferably not more than 75% by weight, especially not more than 70% by weight, based on the weight of any of the ingredients (a) to (d).

The polymerizable material described hereinabove is polymerized in accordance with this invention in the presence of a cationic polymerization catalyst.

The polymerization can be performed by known methods which are frequently used to produce ordinary hydrocarbon resins.

The term "cationic polymerization catalysts", as used in the present application, denotes a catalyst having the ability to form a cation in the polymerization system, and includes, for example, protonic acid, Friedel-Crafts catalysts (Lewis acids), halogens, metal oxides, metal sulfides, halogenated organometallic compounds, and cation exchange resins.

Typical examples of cationic polymerization catalysts used in this invention include Friedel-Crafts catalysts such as boron trifluoride, complexes of boron trifluoride with alcohols, phenols, ethers or organic carboxylic acids (e.g., boron trifluoride phenolate and boron trifluoride etherate), aluminum trichloride, aluminum tribromide, tin tetrachloride, tin tetrabromide, titanium tetrafluoride, titanium tetrachloride, titanium tetrabromide, potassium trifluoride, potassium trichloride, potassium tribromide, molybdenum pentafluoride, molybdenum pentachloride, molybdenum pentabromide, tungsten hexafluoride, tungsten hexachloride, tungsten hexabromide, tungsten pentafluoride, tungsten pentachloride, tungsten pentabromide, rhenium hexachloride, and rhenium hexabromide; and organoaluminum compounds such as diethylaluminum chloride and ethylaluminum dichloride. They may be used either singly or, if required, as a mixture of two or more.

Of these cationic polymerization catalysts, the Friedel-Crafts catalysts, especially boron trifluoride, boron trifluoride complexes, aluminum trichloride, tin tetrachloride and titanium tetrachloride, are preferred. The boron trifluoride, boron trifluoride complexes, and aluminum trichloride are especially preferred. The amount of the catalyst is not particularly restricted. However, its suitable amount is usually 0.1 to 25% by weight, preferably 0.2 to 20% by weight, based on the weight of the polymerizable material.

The polymerization can be performed in the absence of solvent, but usually it is advantageous to perform it in the presence of a solvent. Suitable polymerization solvents are, for example, aliphatic saturated hydrocarbons such as pentane, hexane, heptane and kerosene, and aromatic saturated hydrocarbons such as benzene, toluene and xylene. When these saturated hydrocarbons are contained in the polymerizable material, they can be used as polymerization solvents.

The polymerization can be carried out usually at a temperature ranging from 0° to 200° C., preferably 10° to 150° C. Atmospheric pressure suffices as the polymerization pressure. If desired, elevated or reduced pressures in the range of 0.1 to 50 atmospheres can be employed. Under these polymerization conditions, the polymerization can be completed usually within 10 minutes to 5 hours.

After the polymerization, the catalyst can be removed by such a treatment as washing with an alkali aqueous solution or with water, and the unreacted hydrocarbons or polymers with a low degree of polymerization can be removed by a suitable means such as distillation. Advantageously, the distillation is carried out generally at a temperature of 150° to 250° C. and a pressure of 5 mmHg to 100 mmHg. As a result, hydrocarbon resins are obtained as distillation bottoms.

The most characteristic feature of the present invention lies in the production of a polymer consisting mainly of a chemically modified polymer of the aforesaid polymerizable material by introducing a specified high-boiling product having a boiling point of at least about 150° C. and an oxygen content of at least 0.5% by weight into the polymerization system at any stage of the polymerization process or into the resulting polymer. The high-boiling product is a by-product obtained in a process which comprises oxidizing a benzene or naphthalene ring-substituted with at least one isopropyl group to convert it to the corresponding hydroperoxide and then decomposing it with an acid to produce the corresponding phenol or naphthol.

Introduction of the high-boiling product into the polymerization reaction system can be performed at any desired stage of the polymerization, for example, by mixing the high-boiling product with the polymerizable material before the initiation of the reaction; by adding the high-boiling product to the polymerization reaction mass during the polymerization reaction; or by adding the high-boiling product to the reaction mixture after the polymerization reaction but before removing the cation polymerization catalyst, and continuing the reaction.

Alternatively, the high-boiling product can also be introduced into the polymer by separating the resulting polymer from the polymerization reaction system, adding the high-boiling product to the separated polymer, and reacting them in the presence of the cationic polymerization catalyst.

It is especially preferred in this invention, however, that the high-boiling product be introduced into the polymerization reaction system before the initiation of the polymerization reaction.

The high-boiling product that can be used in the present invention is high-boiling distillation bottoms having a boiling point of at least about 150° C., preferably at least about 160° C., which is obtained as a by-product in the production of a phenol or naphthol by a process which comprises oxidizing a benzene or naphthalene ring-substituted by at least one isopropyl group [the compound of formula (II)] to form a hydroperoxide of formula (III), and then decomposing the product with an acid to form the corresponding phenol or naphthol [the compound of formula (IV)], as schematically shown by

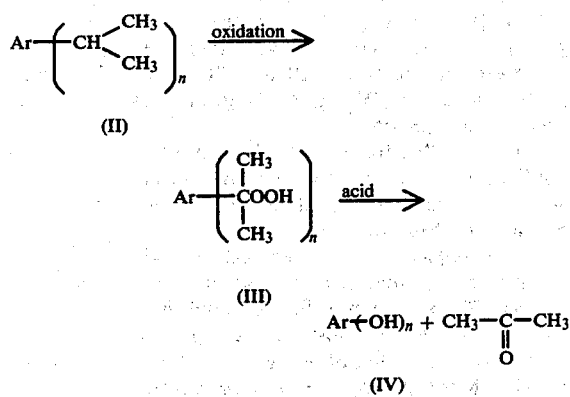

in which Ar represents a benzene or naphthalene ring optionally substituted by one or two lower alkyl groups, especially an unsubstituted benzene ring, monomethyl-substituted benzene ring or unsubstituted naphthalene ring, and n is an integer of at least 1, preferably 1 or 2.

The synthesis of phenols or naphthols of formula (IV) from compounds of formula (II) as schematically shown above is generally a known process called "the cumene process", and finds industrial use in the synthesis of phenol from cumene, cresol from cymene, dihydroxybenzenes (especially hydroquinone and resorcinol) from diisopropylbenzenes, etc. Details of this synthesizing process are described, for example, in P. R. Pujado, J. R. Salazar and C. V. Berger, "Cheapest Route to Phenol", Hydrocarbon Processing, 55, March, 91 (1976), and P. Leprince, A. Chauvel, and J. P. Catry, "Procedes de Petrochimie", Technip, Paris, (1971). This process is summarized below.

According to the "cumene process", a starting compound of formula (II) is first oxidized. Generally, this oxidation is performed by treating the compound (II) with an oxidizing agent in the absence of a solvent, or in the liquid phase in the presence of a suitable solvent. Usually, molecular oxygen-containing gases such as molecular oxygen itself, air, and molecular oxygen diluted with nitrogen gas, etc., are used as the oxidizing agent.

The oxidizing reaction temperature is not critical, and can be varied widely according, for example, to the type of the compound of formula (II), and the type of the solvent. Generally, temperatures of 50° to 200° C., especially 80° to 150° C., are advantageously used. The reaction temperature may be atmospheric pressure, but usually, elevated pressures of about 2 to 15 atmospheres are used.

For promoting the oxidation reaction, it is advantageous to carry out the oxidation reaction in the presence of an alkaline substance.

A specific operating procedure of the oxidation is as follows: First, the starting of formula (II) is fed into an oxidizing tower, and then a molecular oxygen-containing gas is blown into the tower from its bottom. The temperature is raised to the reaction temperature while stirring the system. After a lapse of a certain rate-determining step, the oxidation begins. The hydroperoxide of formula (III) which is an oxidation product of the compound of formula (II) acts also as an oxidation initiator, and once the reaction has begun, the oxidation is carried out in a radical chain fashion. Thus, if a small amount of the hydroperoxide of formula (III) corresponding to the starting material is added prior to the initiation of the reaction, the rate-determining step of the oxidation reaction can be shortened. The condition of the reaction is incessantly monitored by automatically analyzing the oxygen concentration of an exhaust gas from the top of the oxidation tower.

Usually, the reaction is carried out by using a combination of several oxidation towers in which the temperature and the concentration of the hydroperoxide of formula (III) differ, and is controlled so that the hydroperoxide concentration in the final oxidation tower is maintained at about 10 to about 50%.

The oxidation reaction mixture containing the hydroperoxide of formula (III) in the above concentration is distilled at reduced pressure and thus concentrated to a concentration of about 60 to about 90%, before subjecting it to the subsequent acid decomposition step.

The acid decomposition can be performed by using various acid catalysts. For example, the use of such acids as sulfuric acid, hydrochloric acid, nitric acid, hydrobromic acid, phosphoric acid, perchloric acid, silica, and alumina is suggested. These acids can also be used in the present invention, but sulfuric acid which finds extensive industrial use is especially preferred.

Decomposition of the hydroperoxide of formula (III) with such an acid can be performed by contacting the hydroperoxide of formula (III) with the acid. The concentration of the acid can be such that the pH of the acid decomposition system is kept within the range of about 0.5 to about 4.

The temperature of the acid decomposition can be usually about room temperature to about 150° C. The reaction is very exothermic, but the reaction temperature can be adjusted to the desired values by controlling the heat of evaporation by refluxing the resulting compound of formula (IV) or acetone, or by adding a fresh supply of acetone as a diluent.

The acid decomposition reaction mixture is then neutralized with an alkali such as sodium hydroxide or sodium carbonate to neutralize and wash the acid catalyst and the by-product organic acids completely, and the resulting solid matter is separated. It is then subjected to a step of separating and recovering the resulting phenol or naphthol of formula (IV), for example, distillation or extraction.

In the distillation, low-boiling substances such as acetone, water and the unreacted starting compound of formula (II) are removed from the top of a crude acetone tower. The distillation bottoms are distilled in another distillation tower, and the desired compound of formula (IV) is distilled out from the top of the tower. As a result, a high-boiling product consisting substantially of by-products having higher boiling points than the desired phenol or naphthol of formula (IV) remains at the bottom of the tower.

In the separation and recovery of the phenol or naphthol of formula (IV) by extraction, acetone and other substances are removed from a crude acetone tower. Then, a suitable organic solvent having a boiling point of up to about 150° C., such as toluene, xylene cumene, ethylbenzene, cymene, preferably the cumene, is added to the distillation bottoms. Further, an extracting solvent (usually, water) is added to extract the compound of formula (IV) such as phenol, cresol and hydroquinone into the extracting solvent. The organic solvent is removed by distillation from the organic layer resulting from the substantial removal of the compound of formula (IV) by extraction. As a result, a high-boiling product consisting substantially of by-products having a boiling point of at least 150° C. remains at the bottom of the tower.

In the present invention, the high-boiling product that remains at the bottom of the distillation tower is used as a modifying agent. High-boiling products which occur as a by-product in the production of phenol, cresol or dihydroxybenzene from cumene, cymene, or diisopropylbenzene are especially preferred.

Thus, the term "high-boiling product which is obtained as a by-product and has a boiling point of at least 150° C. and an oxygen content of at least 0.5% by weight", as used in the present application, denotes a high-boiling product consisting essentially of by-products substantially free from the phenol or naphthol of formula (IV) remaining after the separation and recovery of the phenol or naphthol of formula (IV). The term "substantially free", as used herein, means that the presence of a small amount (up to 10% by weight, especially up to 5% by weight) of the phenol or naphthol of formula (IV) is permissible.

The composition of such a high-boiling product greatly varies depending upon the type of the starting compound (II), the reaction conditions, etc., and is not definite. Sometimes, unidentified ingredients also exist in the high-boiling products derived from some compounds of formula (II). Generally, it is considered to consist mainly of at least one oxygen-containing by-product exemplified below and/or a polymer thereof.

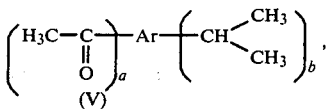

(V)

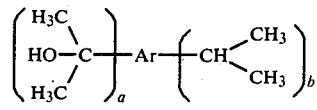

(VI)

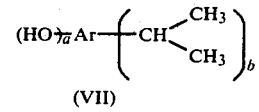

(VII)

In the formulae, Ar represents a benzene or naphthalene ring optionally substituted by 1 or 2 lower alkyl groups, $a+b=n$, a is an integer of at least 1, b is 0 or an integer of at least 1, and n is as defined.

In the present invention, a high-boiling product having a boiling point of at least about 150° C., preferably at least 160° C., most preferably at least about 180° C., and an oxygen content of at least 0.5% by weight, preferably 1 to 17% by weight, more preferably 1 to 14% by weight, is advantageously used.

Usually, the high-boiling product contains hydroxyl groups, and those having a hydroxyl value of at least 10 mg KOH/g, preferably 20 to 500 mg KOH/g, most preferably 25 to 400 mg KOH/g, are advantageously used in the present invention.

The term "hydroxyl value", as used in the present application, denotes the amount in milligrams of potassium hydroxide required to neutralize acetic acid bonded to the hydroxyl group when one gram of a sample is acetylated by a specified method. Specifically, the hydroxyl value in this application is measured by JIS K0070-66 (the neutralization point is determined by using a potentiometer instead of using phenolphthalien).

Preferably, the high-boiling product as obtained having the aforesaid properties is used directly. If required, the high-boiling product is thermally cracked at a temperature of about 200° to about 400° C., the resulting compound of formula (II) is separated and recovered, and the residue can be used as the high-boiling product.

Typical compositions of the high-boiling product suitable for use in the present invention are exemplified below.

(A) High-boiling product having a boiling point of at least about 205° C. obtained in the production of cresol from cymene Table VI

| Component | Content (% by weight) |
| --- | --- |
| m,p-isopropyl phenol | 1-20 (1-10) |
| m,p-cresol | 0-10 (1-5) |
| m,p-methyl acetophenone | 1-20 (1-10) |
| dimethyl acetophenone | 1-10 (1-8) |

Table VI-continued

| Component | Content (% by weight) |
|---|---|
| 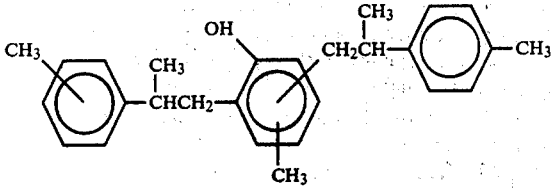 Resinous material presumably having the recurring unit of the formula | 0-30 (5-25) |
| 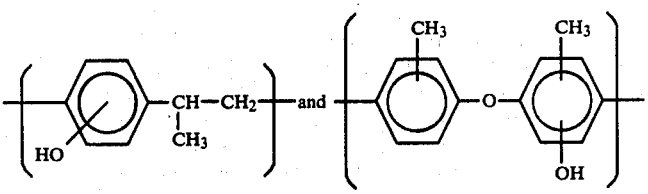 | 0-30 (5-25) |
| 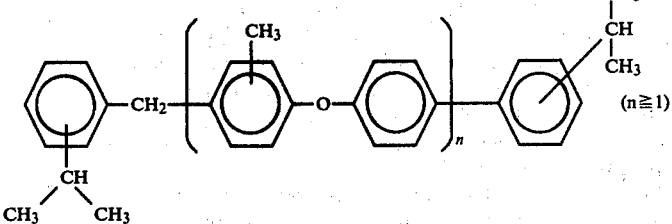 Resinous material having the recurring unit of the formula | 0-40 (5-30) |
| 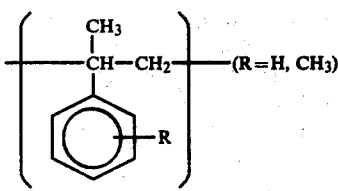 | 0-25 (3-20) |
| Oxygen content: 3-15 wt.% (5-14 wt.%) Hydroxyl value: 25-500 mg KOH/g (30-450 mg KOH/g) | |

(B) High-boiling product having a boiling point of at least about 185° C. obtained in the production of phenol from cumene (the residue left after thermal cracking at about 300° C.)

| Component | Content (% by weight) |
|---|---|
| p-cumyl phenol | 0.5-20 (1-10) |
| isopropyl phenol | 0.1-10 (0.5-5) |
| Copolymer of styrene and α-methyl styrene | 1-60 (5-50) |
| Resinous material (containing a recurring unit derived from styrene, α-methyl styrene, β-methyl styrene, acetophenone, phenol, alkylphenols, etc.) | 20-85 (25-80) |
| Oxygen content: 2-14% by weight (3-13% by weight) Hydroxy value: 5-500 mg/KOH/g (10-400 mg KOH/g) | |

| Component | Content (2t. %) |
|---|---|
| p-isopropyl phenol | 10-70 (15-55) |
| p-isopropenyl phenol | 0-40 (5-30) |
| p-isopropyl acetophenone | 0.5-20 (1-10) |
| p-isopropenyl acetophenone | 0-20 (0-10) |
| p-diisopropyl benzene | 0.5-20 (1-10) |
| Other volatile components | 2-35 (5-30) |
| Unidentified resinous material | 10-80 (15-70) |

-continued

| Component | Content (2t. %) |
|---|---|
| Oxygen content: 2-30 wt. % (5-25 wt. %) Hydroxyl value: 5-1000 mgKOH/g (10-800 mg KOH/g) | |

The amount of the high-boiling product is not critical, and can be varied widely according to the characteristics required of the final polymer, for example. Generally, the suitable amount of the high-boiling product is 5 to 200 parts by weight, preferably 10 to 100 parts by weight, most preferably 12 to 100 parts by weight, per 100 parts by weight of all the cationically polymerizable components of the polymerizable material. When the high-boiling product is to be added to the resulting polymer, its amount is desirably within the above-specified ranges per 100 parts by weight of the polymer.

As stated hereinabove, the high-boiling product can be introduced into the polymerization reaction system at any desired stage of the polymerization of the polymerizable material. For example, it may be mixed with the starting material before the initiation of polymerization, or to the reaction mixture during the polymerization reaction, or to the reaction mixture immediately after the polymerization reaction.

The reaction after mixing of the high-boiling product can be performed in the presence of a cationic polymerization catalyst under the same polymerization reaction conditions as used in the polymerization, thereby not requiring any special attention.

It is also possible to add the high-boiling product to a hydrocarbon polymer produced by the above polymerization reaction and then separated, and react them under the same conditions as the polymerization conditions in the reaction solvent and in the presence of the cationic polymerization catalyst.

Various properties of the resulting modified polymer, such as softening point, molecular weight, molecular weight distribution, melt viscosity, solubility and compatibility, can be varied widely by properly choosing the types of the polymerizable material and/or the high-boiling product, the polymerization conditions, etc.

For example, the softening point of the novel modified polymer of the invention can be varied widely by changing the type and contents of the cationically polymerizable components of the polymerizable material. When a $C_8$–$C_{12}$ fraction having a boiling range of 140° to 280° C. which is formed by the thermal cracking of petroleums is used as the polymerizable material, polymers having a relatively high softening point are generally obtained. The softening points of the resulting polymers increase with increasing content of the aromatic unsaturated hydrocarbons in the $C_{8-12}$ fraction. Likewise, when dicyclopentadienes are used as the polymerizable material, polymers having a high softening point are obtained, and with increasing content of the dicyclopentadiene, the softening points of the resulting polymers increase. Polymers having low softening points can be obtained if a $C_{4-5}$ fraction having a boiling point in the range of −20° C. to +100° C. obtained by the thermal cracking of petroleums is used as the polymerizable material.

The present invention can therefore afford novel polymers having various characteristics which range from liquids at room temperature to solids with a softening point of not more than 200° C., preferably not more than 180° C.

In the polymers obtained by the method of this invention, the hydrocarbon polymer formed by the polymerization of the polymerizable material is chemically modified with the high-boiling product. According to the amount of the high-boiling product, the modified polymer of this invention has an oxygen content of generally 0.5 to 15% by weight, preferably 0.5 to 13% by weight, more preferably 0.5 to 10% by weight, and can advantageously have a hydroxyl value of at least 1 mg KOH/g, preferably 1 to 400 mg KOH/g, more preferably 3 to 300 mg KOH/g.

The novel polymers provided by the present invention can be used as tar substitutes in tar epoxy resin compositions or tar urethane resin compositions which find extensive use in the fields of paints, adhesives, road repairing materials, floor covering materials, etc. according to their various properties such as softening point, molecular weight (usually 200–3,000 in terms of number average molecular weight), molecular weight distribution, melt viscosity, solubility and compatibility. They can also be used as resin binders for general paints, and as adhesives.

The polymers in accordance with this invention can be used especially advantageously as a tar component in tar epoxy resin compositions.

Thus, according to the present invention, there is also provided an epoxy resin composition comprising [A] the novel polymer described hereinabove, [B] a polyepoxy compound, and [C] a curing agent.

The polyepoxy compound that can be used in the epoxy resin composition is a compound containing at least two epoxy groups per molecule. Both low-molecular-weight and high-molecular-weight polyepoxy compounds containing at least two epoxy groups per molecule can be used. They may also be aliphatic or aromatic, or aliphatic/aromatic, or may contain a heterocycle. Thus, any epoxy compounds ordinarily used in the conventional tar epoxy resin compositions are feasible in this invention.

The polyepoxy compound can be freely selected from known compounds according to the purpose of use of the final epoxy resin composition or the characteristics required of the final composition. Specific examples are given below. It should be understood however that the scope of the present invention is in no way limited by these examples.

(1) Polyglycidyl ethers of polyphenols:
Diglycidyl ether of bisphenol A,
diglycidyl ether of bisphenol F,
tetraglycidyl ether of 1,1,2,2-tetrakis(4'-hydroxyphenyl)ethane,
diglycidyl ether of 2,2-bis(4-hydroxyphenyl)nonadecane,
diglycidyl ether of diphenyl ether,
diglycidyl ether of tetrachlorobisphenol A,
diglycidyl ether of tetrabromobisphenol A, and
diglycidyl ether of bisphenol-hexafluoroacetone.
(2) Polyglycidyl ethers of nuclearly hydrogenated products of polyphenol compounds:

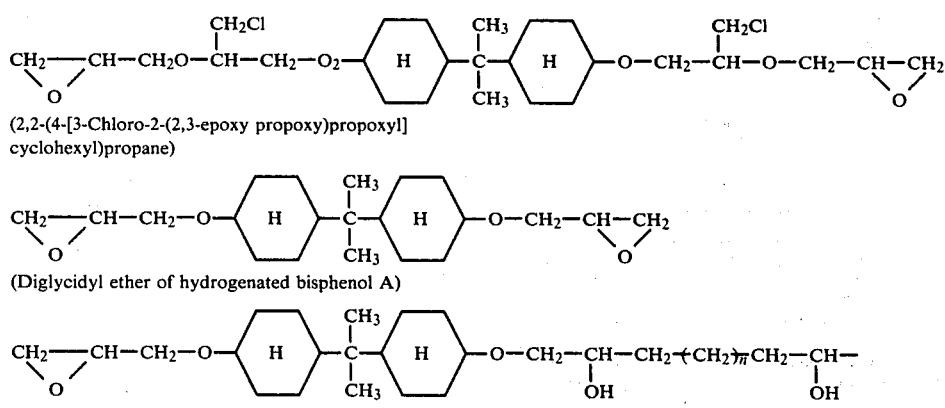

-continued

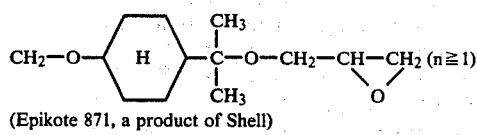

(Epikote 871, a product of Shell)

(3) Polyglycidyl ethers of polyhydric phenols:
Catechol diglycidyl ether, (5) Novolak-type polyepoxy compounds:
Polyglycidyl ether of phenol-formaldehyde novolak

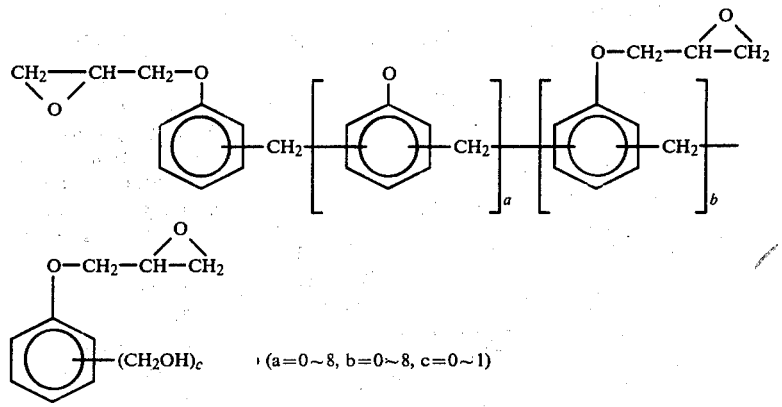

Polyglycidyl ether of o-cresol-formaldehyde novolak

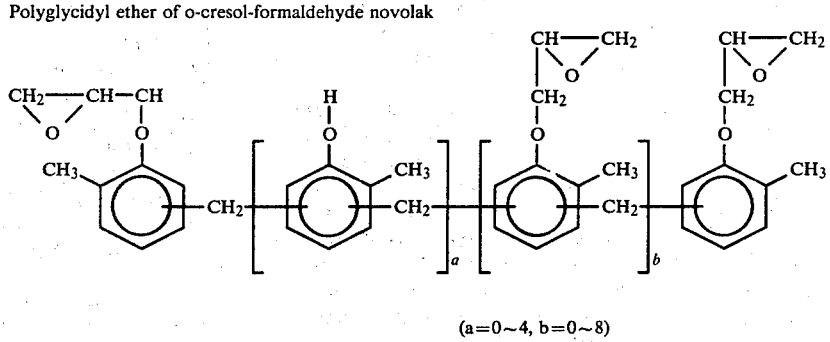

(a=0~4, b=0~8)

resorcinol diglycidyl ether,
hydroquinone diglycidyl ether,
fluoroglycine ditriglycidyl ether,
trihydroxy biphenyl triglycidyl ether,
tetraglycidoxy biphenyl,
methylphloroglycine triglydicyl ether,
tetraglycidyl ether of bis-resorcinol, and
tetraglycidyl ether of resorcinol ketone.
(4) Polyglycidyl ethers of polyhydric alcohols:
Ethylene glycol diglycidyl ether,
butanediol diglycidyl ether,
glycerin diglycidyl ether,
glycerin triglycidyl ether,
pentaerythritol diglycidyl ether,
pentaerythritol triglycidyl ether,
pentaerythritol tetraglycidyl ether,
sorbitol polyglycidyl ethers,
polyoxyalkylene glycol diglycidyl ethers, and
trimethylolpropane triglycidyl ether.

(6) Alicyclic polyepoxy compounds:
Vinyl cyclohexene dioxide,
limonene dioxide,
dicyclopentadiene dioxide,
2,2-bis(3,4-epoxycyclohexyl)propane,
bis(2,3-epoxycyclopentyl) ether, and
disepoxydicyclopentyl ether of ethylene glycol.
(7) Polyglycidyl esters of polycarboxylic acids or
their condensates:
Diglycidyl phthalate,
diglycidyl isophthalate,
diglycidyl tetrahydrophthalate,
diglycidyl ester of dimeric acid,
diglycidyl hexahydrophthalate, and
diglycidyl ester of a condensate of terephthalic acid
(or isophthalic acid) and ethylene glycol (polyester) having the following formula

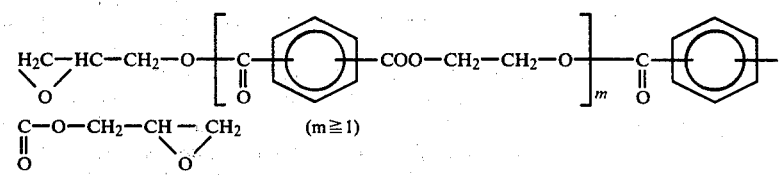

(8) Polyglycidyl amine compounds:

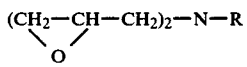

(in which R is a hydrocarbon group with 1 to 25 carbon atoms, such as alkyl, aryl, aralkyl or alkaryl)
[e.g. diglycidyl methyl amine, diglycidyl ethyl amine, diglycidyl propyl amine, and diglycidyl aniline],
triglycidyl p-aminophenol,
triglycidyl isocyanurate, and
tetraglycidyl aminodiphenylmethane.

(9) Methyl epichlorohydrin-type polyepoxy compounds:
Di(2-methyl)glycidyl ether of ethylene glycol,
di(2-methyl)glycidyl ether of bisphenol A,
di(2-methyl)glycidyl ether of bisphenol F,
di(2-methyl)glycidyl phthalate, and
di(2-methyl)glycidyl isophthalate.

Among these polyepoxy compounds, the polyglycidyl ethers of polyphenolic compounds and novolak-type polyepoxy compounds are used conveniently in the present invention. Above all, bisphenol A diglycidyl ether, and bisphenol F diglycidyl ether are preferred.

The epoxy equivalent and molecular weight of the polyepoxy compound that can be used in this invention are not critical, and can be varied widely according to the use and properties of the final polyepoxy resin composition. Generally, it has an epoxy equivalent of at most 5,000, preferably 43 to 3,500, more preferably 80 to 3,000, and a molecular weight of 86 to 20,000, preferably 130 to 10,000, most preferably 150 to 5,000. Those which are liquid or solid at room temperature can be used. Preferably, solid polyepoxy compounds are used as a solution in a suitable solvent.

Any curing agents which are generally known as curing agents for epoxy resins can be used in the polyepoxy resin composition provided by this invention. These curing agents are polyfunctional compounds containing at least two functional groups per molecule, such as primary or secondary amino groups, acid anhydride groups, mercapto groups, or phenolic hydroxyl group. Typical examples are given below. It should be understood that the scope of the invention is in no way limited by these examples.

(1) Linear aliphatic primary polyamines
Diethylene triamine, triethylene tetramine, tetraethylene pentamine, dipropylene diamine, and diethylaminopropylamine.

(2) Alicyclic primary polyamines
N-aminoethylpiperazine, menthanediamine, 1,3-diaminocyclohexane, isophoronediamine, bis(4-amino-3-methylcyclohexyl)methane, 3,9-bis(3-aminopropyl)-2,4,8,10-tetroxaspiro[5,5]undecane, and 1,3-diaminocyclohexane.

(3) Modified aliphatic primary polyamines
(i) Amine-epoxy resin adducts:
Diethylene triamine-bisphenol A glycidyl ether adduct
(ii) Amine-ethylene oxide or propylene oxide adducts:
N,N'-bis(hydroxyethyl)diethylene triamine,
N,N'-bis(hydroxypropyl)diethylene triamine,
N-(hydroxypropyl)diethylene triamine,
N-(2-hydroxy-2,4,4-trimethylphenyl)diethylene triamine,
N-(2-hydroxyethyl)diethylene triamine, and
N,N,N',N'-tetrahydroxypropylene diamine.

(iii) Cyanoethylated polyamines:
Cyanoethylated diethylene triamine, cyanoethylated triethylene tetramine, and cyanoethylated tetraethylene pentamine.
(iv) Ketone-blocked polyamines:
Reaction product between diethylene triamine and a ketone having the formula

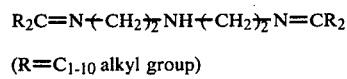

(R=C$_{1-10}$ alkyl group)

(4) Aromatic primary polyamines
o-, or m-Phenylenediamine, diaminodiphenyl ether, 4,4'-methylenedianiline, diaminodiphenyl sulfone, dimethyl diphenyl methane, m-xylylene diamine, 4,4'-bis-(o-toluidine), tetrachloro-p-xylylenediamine, 4,4'-thiodianiline, 4,4'-bis(o-toluidine), dianisidine, 2,4-toluenediamine, methylene-bis(o-chloroaniline), m-aminobenzylamine, a eutectic blend of aromatic amine (e.g., a eutectic blend of m-phenylenediamine and 4,4'-methylenedianiline), and an adduct of an aromatic amine with styrene oxide or phenylglycidyl ether.

(5) Tertiary amine-type curing agents
(i) Aliphatic tertiary amines:
N,N,N',N'-Tetramethyl-1,3-butanediamine, tetramethylguanidine, triethanolamine, 2-dimethylamino-2-hydroxypropane, and trialkylamines such as trimethylamine and triethylamine.
(ii) Alicyclic tertiary amines:
N,N'-dimethylpiperazine, N-methylmorpholine, and 1,4-diazabicyclo(2,2,2)octane.
(iii) Hetroaromatic ring-containing tertiary amines:
Picoline, pyridine, pyrazine, and quinoline.
(iv) Aromatic ring-containing aliphatic tertiary amines:
Benzyldimethylamine, α-methylbenzyldimethylamine, 2-(dimethylaminomethyl)phenol, and 2,4,6-tris(-dimethylaminomethyl)phenol.

(6) Mercaptan-type curing agents

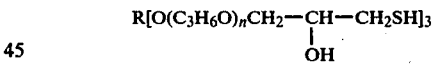

(n = 1~ 2; R = aliphatic hydrocarbon group)

Examples are Thiokol (a trademark for a product of Thiokol Company) and Epi-Cure 861 (a trademark for a product of Cellanese Corporation).

(7) Acid anhydride-type curing agents
Phthalic anhydride, maleic anhydride, trimellitic anhydride, pyromellitic anhydride, hexahydrophthalic anhydride, Nadic Methyl Anhydride (methylbicyclo[2.2.1] heptene-2,3-dicarboxylic anhydride), dodecenylsuccinic anhydride, ethylene glycol bistrimellitate, glycerol tristrimellitate, and tetrahydrophthalic anhydride.

(8) Phenolic hydroxyl-containing compounds
Phenol-formaldehyde precondensates (novolak and resol types), resoricinol, phloroglucinol, 1,5-naphthalenediol, and 4,4'-dihydroxydiphenylsulfone.

(9) Other compounds
(i) boron trifluorine-amine complexes,
(ii) dicyandiamide,
(iii) melamine resins,
(iv) urea resin, (v) 2-ethyl-4-methyl imidazole,
(vi) polysulfide resins
(vii) polyamide resins,
(viii) amide polyamines, and
(ix) polyamide amines.

The reaction products of fatty acids and polyamines (e.g., diethylene triamine, triethylene tetramine, and tetraethylene pentamine).

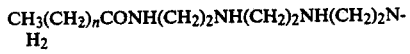

(n=1~20)

These curing agents can be used singly, or if desired, two or more of them may be used as a mixture. The curing agent to be used in a particular composition can be chosen according to the desired rate of curing and properties of the final composition, and those skilled in the art can make such a choice very easily by preliminary routine experiments.

Preferred curing agents for use in the present invention are linear aliphatic primary polyamines such as diethylene triamine, triethylene tetramine, tetraethylene pentamine, dipropylene diamine and diethylamino propane; adducts of aliphatic polyamines with epoxy resins; adducts of aliphatic polyamines with ethylene oxide or propylene oxide; modified aliphatic primary polyamines such as cyanoethylated aliphatic primary polyamines; amide polyamines; aromatic primary polyamines; and acid anhydride-type curing agents.

In the present composition, the proportions of the novel polymer, the polyepoxy compound and the curing agent are not strictly restricted, and can be varied widely according, for example, to the properties required of the final composition. Generally, the novel polymer can be used in an amount of 3 to 2,000 parts by weight, preferably 4 to 1,800 parts by weight, most preferably 5 to 1,500 parts by weight, per 100 parts by weight of the polyepoxy compound. On the other hand, it is advantageous to use the curing agent in an amount of 0.1 to 500 parts by weight, preferably 0.15 to 350 parts by weight, most preferably 0.2 to 200 parts by weight, per 100 parts by weight of the sum of the novel polymer and the polyepoxy compound.

The polyepoxy resin composition provided by the present invention may further contain optional additives. Examples of the additives are phenolic resins, alkyd resins, petroleum resins, pigments (e.g. titanium oxide, antimony oxide, cadmium red, toluidine red, phthalocyanine blue), fillers (e.g., talc, silica, mica, cryolite, clay, calcium carbonate, alumina, portland cement, graphite), reactive diluents (e.g., styrene oxide, allyl glycidyl ether, butyl glycidyl ether, vinylcyclohexene monoxide, dipentene monoxide, glycidyl methacrylate), flexibilizers (e.g., polyamides, polysulfide resins, polyurethane elastomers), and solvents. The amounts of such additives are, for example, 0 to 1000 parts by weight for the pigments and fillers; 0 to 50 parts by weight for the reactive diluents and flexibilizers; and 0 to 2000 parts by weight for the solvents, all per 100 parts by weight of the polyepoxy compound.

The polyepoxy resin compositions provided by the present invention include both room temperature-curable type compositions which cure at room temperature, and heat-curable type compositions which cure only when heated at a temperature of about 50° to about 200° C., depending upon the types of the polyepoxy compound and curing agent to be included in the compositions.

The novel polymers of this invention have superior compatibility with epoxy resins and curing agents. Hence, epoxy resin compositions including the novel modified polymers of this invention can be stored stably over long periods of time. In comparison with tar-containing epoxy resin compositions, the epoxy resin compositions of this invention have reduced bleed-out and superior mechanical strength (e.g., compression or impact strength), abrasion resistance, water resistance, and chemical resistance (e.g., alkali resistance). Therefore, these compositions can be suitably used in fields which use tar-containing epoxy resin compositions, for example as paints, road repairing materials, or slip-preventing floor materials.

Furthermore, in comparison with compositions of epoxy resins and curing agents not containing the novel modified polymers of this invention, the epoxy resin compositions of this invention have superior adhesion, mechanical strength (e.g., compression or impact strength), water resistance, chemical resistance (e.g., alkali or solvent resistance), and thermal stability. These epoxy resin compositions can also be used in a wide range of applications as, for example, cast articles, adhesives and laminated boards.

The following examples illustrate the present invention in more detail.

The "DCPD fraction", "phenol residue", "cresol residue" and "hydroquinone residue" used in the following examples are as follows:

(1) DCPD fraction

This fraction has a boiling point of at least 100° C. and is obtained by heating a $C_5$ fraction having a boiling range of 20° to 100° C. and containing cyclopentadiene (which fraction is obtained during the thermal cracking of petroleum) at 140° C. for 4 hours, and removing fractions having a boiling point of less than 100° C. by distillation. Tables 7 and 12 show the compositions of the DCPD fractions used in these examples.

(2) Phenol residue

This is a high-boiling residue which is obtained by oxidizing cumene with air at an elevated temperature and pressure, distilling the oxidation reaction mixture containing cumene hydroperoxide under reduced pressure, adding sulfuric acid, heating the mixture to obtain an acid-cleavage reaction mixture containing acetone, phenol and high-boiling products, and removing acetone and phenol from the reaction mixture by distillation. The composition and properties of this residue are as follows:

| Composition | Content (wt. %) |
| --- | --- |
| -m, p-isopropyl phenol | 3 |
| p-cumyl phenol | 0.5 |
| Copolymer of styrene and α-methylstyrene and other resinous ingredients (containing structural units such as styrene, α-methylstyrene, acetophenone and alkylphenol) | 94 |
| Unidentifiable ingredients | 2.5 |
| Properties | |
| Softening point: 68° C. | |
| Oxygen content: 6.3% by weight | |

| Composition | Content (wt. %) |
|---|---|
| Hydroxyl value: 110 mg KOH/g | |

(3) Cresol residue

This is a high-boiling residue which is obtained by preparing cymene hydroperoxide from cymene in a similar manner to the above-described procedure of preparing the cumene hydroperoxide from cumene, cleaving the reaction mixture with an acid, and separating acetone and cresol from the acid-cleavage product. The composition and properties of the cresol residue are as follows:

| Composition | Content (wt. %) |
|---|---|
| m, p-isopropyl phenol | 7 |
| m, p-cresol | 3.3 |
| m, p-methylacetophenone | 10 |
| Dimethylacetophenone | 2 |
| 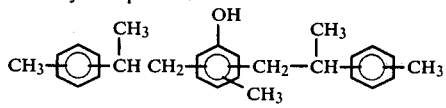 | 14 |
| Resinous material having the recurring units of the formulae: | 15 |
| 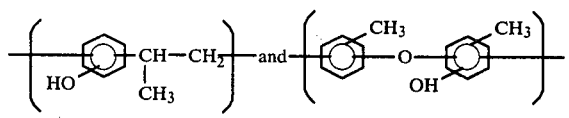 | |
| 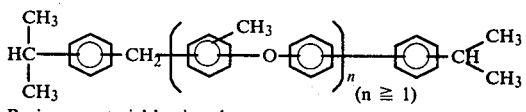 | 22 |
| Resinous material having the recurring unit of the formula | 7 |
| 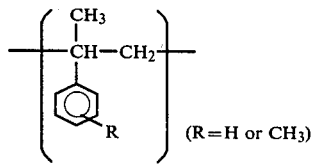 | |
| Unidentifiable ingredients | 20 |

Properties

Softening point: below room temperature
Boiling point: more than 205° C.
Oxygen content: 11.2% by weight
Hydroxyl value: 268 mg KOH/g (4) Hydroquinone residue This is a high-boiling residue which is obtained by preparing p-diisopropylbenzene hydroperoxide from p-diisopropylbenzene in a similar manner to the above-mentioned procedure of preparing cumene hydroperoxide from cumene, dissolving the reaction mixture in methyl isobutyl ketone, adding sulfuric acid, heating the mixture to cleave it, distilling off methyl isobutyl ketone from the acid-cleavage reaction mixture, dissolving the residue in an organic solvent, separating hydroquinone by extraction with water, and removing the solvent by distillation. The composition and properties of the hydroquinone residue are as follows:

| Composition | Content (wt. %) |
|---|---|
| p-isopropyl phenol | 33 |
| p-isopropyl acetophenone | 2 |
| p-isopropenyl acetophenone | 2 |
| p-diisopropyl benzene | 4 |
| Resinous ingredients | 45 |
| Unidentifiable volatile ingredients | 14 |

Properties

Softening point: below room temperature
Boiling point: more than 150° C.
Oxygen content: 8.5% by weight
Hydroxyl value: 17.5 mg KOH/g The color (Gardner) of the polymer was measured in accordance with ASTM D-1544-68, and the softening point of the polymer, in accordance with JIS K-2531.

EXAMPLE 1

A 3-liter glass reactor equipped with a thermometer, a reflux condenser, a feed opening and a stirrer was charged with a mixture consisting of 1,670 g of the DCPD fraction (whose composition is shown in Table 7) and 330 g of the phenol residue. The mixture was stirred to form a solution. To the solution was added dropwise 40 g of a boron trifluoridephenol complex as a catalyst. In an atmosphere of nitrogen, the solution was polymerized at 50° C. for 2 hours. To the resulting polymerization product was added 1.3 liters of a 0.3 N aqueous solution of sodium hydroxide, and the mixture was stirred for 30 minutes. The aqueous layer was separated, and the residue was washed with water until the wash liquid became neutral. The aqueous layer was separated, and the residue was concentrated at 200° C. and 5 mmHg for 30 minutes to form a polymer.

The properties of the resulting polymer are shown in Table 10.

EXAMPLE 2

The procedure of Example 1 was repeated except that an aliphatic unsaturated hydrocarbon-containing fraction having a boiling range of 20° to 100° C. (whose composition is shown in Table 8) obtained during the thermal cracking of petroleum was used instead of the DCPD fraction. The properties of the polymer obtained are shown in Table 10.

EXAMPLE 3

The procedure of Example 1 was repeated except that an aromatic unsaturated hydrocarbon-containing fraction having a boiling range of 140° to 280° C. (whose composition is shown in Table 9) obtained during the thermal cracking of petroleum was used instead of the DCPD fraction. The properties of the polymer obtained are shown in Table 10.

Table 7

| Composition of DCPD fraction (% by weight) | |
| --- | --- |
| Ingredients | Content (% by weight) |
| n-Pentane | 1.7 |
| Isoprene | 1.1 |
| 2,3-Dimethylbutane | 4.8 |
| Trans-piperylene | 1.2 |
| Cis-piperylene | 2.8 |
| n-Hexane | 3.3 |
| Cyclopentadiene | 1.7 |
| Dicyclopentadiene | 67.3 |
| Others | 16.1 |
| Total of the unsaturated ingredients | 74.1 |

Table 8

| Aliphatic unsaturated hydrocarbon containing fraction | |
| --- | --- |
| Ingredients | Content (% by weight) |
| 2-Butene | 0.6 |
| 1,3-Butadiene | 1.7 |
| n-Pentane | 19.3 |
| 1-Pentene | 7.3 |
| 2-Methyl-1-butene | 8.9 |
| Trans-2-pentene | 3.7 |
| Cis-2-pentene | 2.5 |
| 2-Methyl-2-butene | 3.3 |
| Isoprene | 14.0 |
| 2,3-Dimthylbutane | 4.3 |
| Trans-piperylene | 5.8 |
| Cis-piperylene | 7.2 |
| n-Hexane | 1.5 |
| Cyclopentadiene | 1.1 |
| Dicyclopentadiene | 0.7 |
| Others | 18.1 |
| Total of unsaturated ingredients | 56.8 |

Table 9

| Composition of the aromatic unsaturated hydrocarbon-containing fraction | |
| --- | --- |
| Ingredients | Content (% by weight) |
| Styrene | 2.0 |
| α-Methylstyrene | 1.8 |
| β-Methylstyrene | 2.3 |
| Vinyltoluene (o-, p-, m-) | 17.4 |
| Indene | 9.5 |
| Methylindene | 3.4 |
| Trimethylbenzene | 10.7 |
| Naphthalene | 4.0 |

Table 9-continued

| Composition of the aromatic unsaturated hydrocarbon-containing fraction | |
| --- | --- |
| Ingredients | Content (% by weight) |
| Other $C_{9-12}$ saturated aromatic hydrocarbons | 36.1 |
| Paraffins and unidentifiable ingredients | 12.8 |

Table 10

| | Properties of the copolymer | | |
| --- | --- | --- | --- |
| Example | Yield (%) | Softening point (°C.) | Color (Gardner) |
| 1 | 34 | 69 | 18 |
| 2 | 43 | 70 | 18 |
| 3 | 44 | 80 | 18 |

EXAMPLE 4

A mixture consisting of 1600 g of the DCPD fraction (whose composition is shown in Table 7) and 400 g of the cresol residue was fed into a 3-liter glass reactor equipped with a thermometer, a reflux condenser, a feed opening and a stirrer, and stirred to form a solution. To the solution was added dropwise 30 g of a boron trifluoride/phenol complex, and the solution was polymerized at 50° C. for 2 hours. To the resulting polymerization product was added 1.3 liters of a 0.3 N aqueous solution of sodium hydroxide, and the mixture was stirred for 30 minutes. The aqueous layer was separated, and the residue was repeatedly washed with water until the wash liquid became neutral. The aqueous layer was separated, and the residue was concentrated at 200° C. and 5 mmHg for 30 minutes to afford a polymer having the characteristics shown in Table 11.

EXAMPLES 5 AND 6

The procedure of Example 4 was repeated except that 1600 g of each of the unsaturated hydrocarbon fractions shown in Table 11 was used instead of 1600 g of the DCPD fraction. The properties of the resulting polymer are shown in Table 11.

Table 11

| | | Polymer | | |
| --- | --- | --- | --- | --- |
| Example | Unsaturated hydrocarbon-containing fraction | Yield (%) | Softening point (°C.) | Color (Gardner) |
| 4 | DCPD fraction shown in Table 7 | 24 | 45 | 18 |
| 5 | Aliphatic unsaturated hydrocarbon containing fraction shown in Table 8 | 35 | 54 | 18 |
| 6 | Aromatic unsaturated hydrocarbon-containing fraction shown in Table 9 | 35 | 65 | 18 |

EXAMPLE 7

A 3-liter glass reactor equipped with a thermometer, a reflux condenser, a feed opening and a stirrer was charged with 1500 g of DCPD fraction having the composition shown in Table 12 and 500 g of the cresol residue, and they were stirred to form a solution. To the solution was added dropwise 45 g of a boron trifluoride/phenol complex as a catalyst, and in an atmosphere of nitrogen, the solution was polymerized at 50°

C. for 2 hours. To the resulting polymerization product was added 1.5 liters of a 0.3 N aqueous solution of sodium hydroxide, followed by water washing and concentration in the same way as in Example 1 to afford a dark brown polymer in a yield of 31%. The polymer had a Gardner color number of 18 and a softening point of 46° C., and showed good compatibility with epoxy resins (R-140, R-144 and R-301).

Table 12

| Composition of the DCPD fraction | |
| --- | --- |
| Ingredients | Content (% by weight) |
| n-Pentane | 1.5 |
| Isoprene | 1.3 |
| 2,3-Dimethylbutane | 1.5 |
| Trans-piperylene | 1.3 |
| Cis-piperylene | 2.6 |
| n-Hexane | 0.6 |
| Cyclopentadiene | 0.4 |
| Dicyclopentadiene | 81.4 |
| Others | 9.4 |
| Total of unsaturated ingredients | 87.6 |

EXAMPLES 8 TO 10

The procedure of Example 4 was repeated except that the amounts of the DCPD fraction indicated in Table 7 and the cresol residue were changed as shown in Table 13. The results are shown in Table 13.

Table 13

| | Materials for polymer | | Polymer obtained | | |
| --- | --- | --- | --- | --- | --- |
| Example | Amount of DCPD fraction (g) | Amount of the cresol residue (g) | Yield (%) | Color (Gardner) | Softening point (°C.) |
| 8 | 1700 | 300 | 23 | 18 | 65 |
| 9 | 1400 | 600 | 24 | 18 | 50 |
| 10 | 1000 | 1000 | 23 | 18 | 67 |

All of these polymers showed good compatibility with epoxy resins (R-140, R-144, and R-301).

EXAMPLES 11 TO 13

The procedure of Example 4 was repeated except that the amounts of the boron trifluoride/phenol complex catalyst and the polymerization temperature were changed as shown in Table 14. The results are shown in Table 14.

All of the polymers showed good compatibility with epoxy resins (R-140, R-144, and R-301.

Table 14

| | Polymer conditions | | Polymer obtained | | |
| --- | --- | --- | --- | --- | --- |
| Example | Amount of BF$_3$ · PhOH (g) | Polymerization temperature (°C.) | Yield (%) | Color (Gardner) | Softening point (°C.) |
| 11 | 50 | 50 | 36 | 18 | 47 |
| 12 | 20 | 50 | 14 | 18 | 58 |
| 13 | 30 | 20 | 17 | 18 | 55 |

EXAMPLE 14

The same reactor as used in Example 1 was charged with 15 g of anhydrous aluminum chloride as a catalyst and 50 ml of n-hexane, and with stirring, a mixture of 400 g of the cresol residue and 1600 g of the DCPD fraction having the same composition as used in Example 1 was added dropwise and polymerized at 50° C. for 2 hours in an atmosphere of nitrogen. To the resulting polymerization product was added 300 ml of a 0.3 N aqueous solution of sodium hydroxide, followed by water washing and concentration in the same way as in Example 1 to afford a dark brown polymer in a yield of 16%. The polymer had a Gardner color number of 18 and a softening point of 59° C., and showed good compatibility with epoxy resins (R-140, R-144, and R-301).

EXAMPLE 15

The procedure of Example 4 was repeated except that 400 g of the hydroquinone residue was used instead of the cresol residue. A dark brown polymer was obtained in a yield of 43%. The polymer had a Gardner color number of 18 and a softening point of 106° C.

EXAMPLES 16 AND 17

The procedure of Example 3 was repeated except that the amounts of the aromatic unsaturated hydrocarbon-containing fraction and the phenol residue were changed as shown in Table 15. The properties of the polymers are shown in Table 15.

Table 15

| | Materials for polymer | | Polymer | | |
| --- | --- | --- | --- | --- | --- |
| Ex. | Amount of the aromatic unsaturated hydrocarbon-containing fraction (g) | Amount of the phenol residue (g) | Yield (%) | Softening point (°C.) | Color (Gardner) |
| 16 | 1800 | 200 | 41 | 90 | 18 |
| 17 | 1350 | 650 | 48 | 52 | 18 |

EXAMPLE 18

The procedure of Example 4 was repeated except that a mixture of 800 g of the DCPD fraction having the same composition as used in Example 4 and 800 g of α-methylstyrene was used instead of 1600 g of the DCPD fraction. A dark brown polymer was obtained in a yield of 33%. The polymer had a Gardner color number of 18 and a softening point of 38° C. and exhibited good compatibility with epoxy resins (R-140, R-144 and R-301).

EXAMPLE 19

A 4:1 mixture of the same DCPD fraction as used in Example 1 and the cresol residue and a boron trifluoride/phenol complex catalyst were fed at a rate of 610 g/hr and 9 g/hr, respectively, into a 1-liter glass polymerization tank equipped with a thermometer, a reflux condenser, a feed opening and a stirrer, and polymerized at 50°±2° C. with a residence time of 1.5 hours. The resulting product was washed with water and concentrated in the same way as in Example 1 to form a dark brown polymer in a yield of 24%. The polymer had a Gardner color number of 18 and a softening point of 39° C., and exhibited good compatibility with epoxy resins (R-140, R-144 and R-301).

EXAMPLE 20

The procedure of Example 1 was repeated except that α-methylstyrene was used instead of the DCPD fraction. A polymer having a Gardner color number of 18 and a softening point of 92° C. was obtained in a yield of 82%.

EXAMPLE 21

The procedure of Example 4 was repeated except that a mixture of 800 g of the same DCPD fraction as used in Example 4 and 800 g of the same aromatic unsaturated hydrocarbon-containing fraction as used in Example 3 was used instead of 1600 g of the DCPD fraction. A polymer having a Gardner color number of 18 and a softening point of 50° C. was obtained in a yield of 39%.

EXAMPLE 22

The procedure of Example 4 was repeated except that a mixture of 800 g of the same DCPD fraction as used in Example 4 and 800 g of isobutylene was used instead of 1600 g of the DCPD fraction. A polymer having a Gardner color number of 18 and a softening point of 45° C. was obtained in a yield of 48%.

EXAMPLE 23

A 500 ml reactor equipped with a thermometer, a reflux condenser, a feed opening and a stirrer was charged with 200 g of the DCPD fraction having the composition shown in Table 7, and 3 g of a boron trifluoride/phenol complex as a catalyst was added dropwise. The fraction was polymerized at 50° C. for 2 hours in an atmosphere of nitrogen. To the resulting product was added 132 ml of a 0.2 N aqueous solution of sodium hydroxide, and the mixture was stirred for 30 minutes. The aqueous layer was separated, and the residue was washed with water until the wash liquid became neutral. The aqueous layer was separated, and the residue was concentrated at 200° C. and 5 mmHg for 30 minutes to afford an orange red hydrocarbon resin in a yield of 24%. The resulting resin had a Gardner color number of 14 and a softening point of 81° C.

A mixture consisting of 40 g of the resulting hydrocarbon resin, 60 g of the cresol residue (having an oxygen content of 11.2% by weight and containing 58% by weight of involatile matter) and 100 ml of dehydrated xylene as a catalyst was fed into the same reactor as described above, and stirred. To the resulting solution was added dropwise 1.5 g of a boron trifluoride/phenol complex as a catalyst, and the reaction was carried out at 50° C. for 2 hours in an atmosphere of nitrogen. To the resulting reaction product was added 66 ml of a 0.2 N aqueous solution of sodium hydroxide, and the mixture was stirred for 30 minutes. The aqueous layer was separated, and the oil layer was repeatedly washed with water until the wash liquid became neutral. The washed oil layer was concentrated at 200° C. and 5 mmHg for 30 minutes to afford a dark brown modified hydrocarbon resin in a yield of 85%. This resin had a Gardner color number of 18 and a softening point of 49° C.

EXAMPLE 24

A 500 ml reactor equipped with a thermometer, a reflux condenser, a feed opening and a stirrer was charged with 500 g of the DCPD fraction having the composition shown in Table 7, and 3 g of a boron trifluoride/phenol complex as a catalyst was added dropwise. The DCPD fraction was polymerized at 50° C. for 2 hours in an atmosphere of nitrogen. To the reaction mixture was added 500 g of the phenol residue, and 10 g of a boron trifluoride/phenol complex was added dropwise. The polymerization was further carried out at 50° C. for 2 hours in an atmosphere of nitrogen. To the resulting product was added 530 ml of a 0.2 N aqueous solution of sodium hydroxide, and the mixture was stirred for 30 minutes. The aqueous layer was separated. The oil layer was repeatedly washed until the wash liquid became neutral. The aqueous layer was separated, and the residue was concentrated at 200° C. and 5 mmHg for 30 minutes to afford a polymer in a yield of 65%. The polymer had a Gardner color number of 18, and a softening point of 76° C.

EXAMPLE 25

40 Parts by weight of EPOMIK R-130 (a trademark for a glycidyl ether of bisphenol A produced by Mitsui Petrochemical Epoxy Co., Ltd.), 45 parts by weight of the polymer obtained in Example 1 and 100 parts by weight of calcium carbonate were kneaded sufficiently by a mixer, and then 20 parts of Q-655 (a trademark for a polyamine curing agent produced by Mitsui Petrochemical Epoxy Co., Ltd.) was added to form an epoxy resin composition.

A curing test was performed on the epoxy resin composition, and the results are shown in Table 16.

EXAMPLES 26 TO 48

The procedure of Example 26 was repeated except that each of the polymers indicated in Table 16 was used instead of the polymer obtained in Example 1. The results are shown in Table 16.

EXAMPLE 49

The procedure of Example 25 was repeated except that the amount of the bisphenol A glycidyl ether epoxy resin was changed to 25 parts by weight, and the amount of the polymer obtained in Example 1 was changed to 60 parts by weight. The results are shown in Table 16.

EXAMPLE 50

The procedure of Example 49 was repeated except that the polymer obtained in Example 3 was used instead of the polymer obtained in Example 1. The results are shown in Table 16.

EXAMPLE 51

The procedure of Example 50 was repeated except that EPOMIK R-144 (a trademark for a glycidyl ether of bisphenol A produced by Mitsui Petrochemical Epoxy Co., Ltd.) was used. The results are shown in Table 16.

COMPARATIVE EXAMPLE 1

The procedure of Example 25 was repeated except that coal tar (TARCRON #180, a trademark for a product of Yoshida Seiyu Kabushiki Kaisha) was used instead of the polymer obtained in Example 1. The results are shown in Table 16.

COMPARATIVE EXAMPLE 2

The procedure of Example 49 was repeated except that the same coal tar as used in Comparative Example 1 was used instead of the polymer obtained in Example 1. The results are shown in Table 16.

COMPARATIVE EXAMPLES 3 AND 4

The procedure of Example 25 was repeated except that the cresol residue (Comparative Example 3) or the reaction product between the cresol residue and formaldehyde (Comparative Example 4) was used instead of the polymer obtained in Example 1. The results are shown in Table 16.

Table 16

| Example | 25 | 26 | 27 | 28 | 29 | 30 | 31 |
|---|---|---|---|---|---|---|---|
| Polymer obtained in Example | 1 | 2 | 3 | 4 | 5 | 6 | 7 |
| Results of the curing test | | | | | | | |
| Pot life (1) (25° C., minutes) | 120 | 105 | 95 | 130 | 115 | 100 | 70 |
| Curing time (2) (25° C., hrs) | 8.0 | 7.5 | 7.0 | 8.5 | 8.5 | 7.5 | 6.0 |
| Appearance (3) | No change | No change | No change | No change | No change | No change | No change |
| 10% Compression stress (4) (kg/cm$^2$) | 18.5 | 17.8 | 20.1 | 18.0 | 18.1 | 19.7 | 25.0 |
| Charpy impact strength (5) (kg · cm/cm$^2$) | 3.2 | 3.1 | 3.5 | 3.4 | 3.0 | 3.2 | 3.8 |
| Thermal stability (JIS K6911, 150° C.) | No change | No change | No change | No change | No change | No change | No change |
| Water absorption (%, JIS K6911) | 0.2 | 0.3 | 0.2 | 0.1 | 0.1 | 0.2 | 0.4 |
| Alkali resistance (6) (%) | 0.5 | 0.6 | 0.6 | 0.3 | 0.3 | 0.3 | 0.6 |

| Example | 32 | 33 | 34 | 35 | 36 | 37 | 38 |
|---|---|---|---|---|---|---|---|
| Polymer obtained in Example | 8 | 9 | 10 | 11 | 12 | 13 | 14 |
| Results of the curing test | | | | | | | |
| Pot life (1) (25° C., minutes) | 110 | 75 | 49 | 145 | 110 | 120 | 106 |
| Curing time (2) (25° C., hrs) | 7.5 | 6.3 | 5.1 | 9.0 | 7.2 | 3.0 | 7.6 |
| Appearance (3) | No change | No change | No change | No change | No change | No change | No change |
| 10% Compression stress (4) (kg/cm$^2$) | 18.5 | 19.0 | 19.1 | 17.1 | 19.1 | 18.5 | 18.5 |
| Charpy impact strength (5) (kg · cm/cm$^2$) | 3.0 | 3.3 | 3.5 | 3.0 | 3.5 | 3.3 | 3.0 |
| Thermal stability (JIS K6911, 150° C.) | No change | No change | No change | No change | No change | No change | No change |
| Water absorption (%, JIS K6911) | 0.1 | 0.3 | 0.4 | 0.2 | 0.3 | 0.3 | 0.3 |
| Alkali resistance (6) (%) | 0.3 | 0.5 | 0.5 | 0.4 | 0.6 | 0.5 | 0.4 |

| Example | 39 | 40 | 41 | 42 | 43 | 44 | 45 |
|---|---|---|---|---|---|---|---|
| Polymer obtained in Example | 15 | 16 | 17 | 18 | 19 | 20 | 21 |
| Results of the curing test | | | | | | | |
| Pot life (1) (25° C., minutes) | 100 | 110 | 75 | 92 | 125 | 150 | 122 |
| Curing time (2) (25° C., hrs) | 7.0 | 8.0 | 6.5 | 7.5 | 8.5 | 9.8 | 8.2 |
| Appearance (3) | No change | No change | No change | No change | No change | No change | No change |
| 10% Compression stress (4) (kg/cm$^2$) | 18.0 | 19.0 | 24.6 | 17.9 | 18.4 | 16.5 | 18.2 |
| Charpy impact strength (5) (kg · cm/cm$^2$) | 3.2 | 2.8 | 3.9 | 3.3 | 3.3 | 3.0 | 3.0 |
| Thermal stability (JIS K6911, 150° C.) | No change | No change | No change | No change | No change | No change | No change |
| Water absorption (%), JIS K6911 | 0.3 | 0.1 | 0.3 | 0.2 | 0.1 | 0.3 | 0.2 |
| Alkali resistance (6) (%) | 0.6 | 0.2 | 0.4 | 0.4 | 0.2 | 0.5 | 0.5 |

| Example | 46 | 47 | 48 | 1 (Comp.) | 2 (Comp.) | 3 (Comp.) |
|---|---|---|---|---|---|---|
| Polymer obtained in Example | 22 | 23 | 24 | TARCRON #180 | TARCRON #180 | Cresol residue |
| Results of the curing test | | | | | | |
| Pot life (1) (25° C., minutes) | 117 | 115 | 110 | 240 | 400 | 50 |
| Curing time (2) (25° C., hrs) | 8.1 | 7.8 | 7.5 | 11.0 | 20.5 | 4.6 |
| Appearance (3) | No change | No change | No change | Some bleed-out occurred | Bleed-out occurred | No change |
| 10% Compression stress (4) (kg/cm$^2$) | 20.5 | 17.5 | 17.1 | 14.7 | 10.9 | 16.1 |
| Charpy impact strength (5) (kg · cm/cm$^2$) | 3.6 | 2.5 | 2.4 | 2.5 | 2.0 | 2.8 |
| Thermal stability (JIS K6911, 150° C.) | No change | No change | No change | Blister occurred | Blister occurred | No change |
| Water absorption (%, JIS K6911) | 0.2 | 0.3 | 0.1 | 0.4 | 0.3 | 1.2 |
| Alkali resistance (6) | 0.5 | 0.6 | 0.3 | 0.8 | 1.0 | 1.6 |

Table 16-continued

| (%) | | | | |
|---|---|---|---|---|
| Example | 4 (Comp.) | 49 | 50 | 51 |
| Polymer obtained in Example | * | 1 | 2 | 3 |
| Results of the curing test | | | | |
| Pot life (1) (25° C., minutes) | 55 | 160 | 120 | 70 |
| (25° C., hrs) | | | | |
| Appearance (3) | No change | No change | No change | No charge |
| 10% Compression stress (kg/cm$^2$) | 18.1 | 17.4 | 18.0 | 20.9 |
| Charpy impact strength (5) (kg · cm/cm$^2$) | 3.0 | 2.7 | 2.9 | 4.0 |
| Thermal stability (JIS K6911, 150° C.) | No change | No change | No change | No chage |
| Water absorption (%, JIS K6911) | 1.1 | 0.2 | 0.1 | 0.1 |
| Alkali resistance (6) (%) | 1.5 | 0.7 | 0.3 | 0.2 |

*The reaction product between the cresol residue and formaldehyde.
(1) Tested on 50 g of the epoxy resin;
(2) 20 g of the epoxy composition as produced is cast to a thickness of about 1 cm on an iron plate, and the curing time is evaluated by finger touch;
(3) The appearance of the cured composition after the measurement of the curing time is visually observed;
(4) and (5) The sample is cured and aged at 20° C. for 2 days and then tested in accordance with JIS K6911;
(6) The percent increase in weight after dipping the sample for 1 day in a 10% aqueous solution of sodium hydroxide At ₂5° C.

EXAMPLE 52

A mixture consisting of 100 parts by weight of EPO-MIK (a trademark for a glycidyl ether of bisphenol A, a product of Mitsui Petrochemical Epoxy Co., Ltd), 130 parts of the polymer obtained in Example 3, 80 parts by weight of calcium carbonate, 38 parts by weight of talc, 15 parts by weight of titanium oxide and 2 parts by weight of Aerosil (a trademark for submicroscopic pyrogenic silica) was thoroughly kneaded by passing once through a three-roll mill. Then, 30 parts by weight of Q-614 (a trademark for an aliphatic polyamine curing agent, a product of Mitsui Petrochemical Epoxy Co., Ltd.) was added to form an epoxy resin composition useful for preventing slipping on floors. The composition was cured and aged at room temperature for 7 days, and then subjected to an abrasion resistance test. The results are shown in Table 17.

COMPARATIVE EXAMPLE 5

The procedure of Example 52 was repeated except that the same coal tar as used in Comparative Example 1 was used instead of the polymer obtained in Example 3. The results of the abrasion resistance test are shown in Table 17.

Table 17

| Taber abrasion tester, load 500 g, 1000 revolutions | |
|---|---|
| Example 52 | Comparative Example 5 |
| Amount of wear (mg) 120 | 480 |

EXAMPLE 53

A mixture consisting of 50 parts by weight of EPO-MIK R-130 (a trademark for a product of a glycidyl ether of bisphenol A, a product of Mitsui Petrochemical Epoxy Co., Ltd.), 40 parts by weight of the polymer obtained in Example 4, 45 parts by weight of calcium carbonate, 35 parts by weight of talc, 2 parts by weight of activated carbon and 5 parts by weight of butyl Cellosolve was fully kneaded by a mixer. Then, 30 parts by weight of Q-610 (a trademark for an aliphatic polyamine curing agent, a product of Mitsui Petrochemical Epoxy Co., Ltd.) was added to form an adhesive composition useful for preventing cracks in timber.

COMPARATIVE EXAMPLE 6

The procedure of Example 53 was repeated except that the same coal tar as used in Comparative Example 1 was used instead of the polymer obtained in Example 4. The composition was cured at 20° C. for 2 days, and its strength was measured. The results are shown in Table 18.

Table 18

| Strength | Example 53 | Comparative Example 6 |
|---|---|---|
| 10% Compression stress (kg/cm$^2$, JIS K6911) | 24.0 | 18.0 |
| Charpy impact strength (kg/cm$^2$, JIS K6911) | 3.6 | 2.7 |

What we claim is:
1. An epoxy resin composition comprising
(A) a novel copolymer produced by polymerizing a polymerizable material selected from the group consisting of
  (a) substituted or unsubstituted dicyclopentadiene,
  (b) a cationically polymerizable unsaturated hydrocarbon-containing fraction obtained by distilling a cracking or reforming product of a petroleum and having a boiling point in the range of −20° C. to 280° C.,
  (c) a cationically polymerizable vinyl aromatic hydrocarbon having 8 to 10 carbon atoms,
  (d) a mixture of two or three of ingredients (a), (b) and (c), and
  (e) a mixture of any one of ingredients (a) to (d) with a cationically polymerizable unsaturated aliphatic hydrocarbon having 4 to 10 carbon atoms in the presence of a cationic polymerization catalyst with a high-boiling product having a boiling point of at least about 150° C. and an oxygen content of at least 0.5% by weight being introduced into the polymerization system at any stage of the polymerization process or into the resulting polymer, the said high-boiling product being obtained as a residue, comprising a mixture of by-products, in a process comprising oxidizing a benzene or naphthalene ring-substituted with at least one isopropyl group to convert it to the corresponding hydroperoxide, decomposing the hydroperoxide with an acid to produce the corresponding phenol or naphthol, and separating the phenol or naphthol from the resultant reaction mixture to obtain said residue comprising a mixture of said by-products;

(B) a polyepoxy compound; and
(C) a curing agent.

2. The composition of claim 1 wherein the substituted or unsubstituted dicyclopentadiene is dicyclopentadiene, methyldicyclopentadiene or dimethyldicyclopentadiene.

3. The composition of claim 1 wherein the substituted or unsubstituted dicyclopentadiene is crude substituted or unsubstituted dicyclopentadiene having a purity of at least 35% by weight and produced by the thermal dimerization of the corresponding substituted or unsubstituted cyclopentadiene.

4. The composition of claim 1 wherein the cationically polymerizable unsaturated hydrocarbon-containing fraction is a fraction composed mainly of $C_8$–$C_{12}$ aromatic unsaturated hydrocarbons having a boiling point in the range of 140° to 280° C.

5. The composition of claim 1 wherein the cationically polymerizable unsaturated hydrocarbon-containing fraction is a fraction composed mainly of $C_4$–$C_5$ aliphatic unsaturated hydrocarbons having a boiling point in the range of −20° C. to +100° C.

6. The composition of claim 1 wherein the cationically polymerizable unsaturated hydrocarbon-containing fraction is a mixture consisting of (1) a fraction composed mainly of $C_4$–$C_5$ aliphatic unsaturated hydrocarbons having a boiling point in the range of −20° C. to 100° C. and (2) a fraction composed mainly of $C_8$–$C_{12}$ aromatic unsaturated hydrocarbons having a boiling point in the range of 140° to 280° C.

7. The composition of claim 1 wherein the cationically polymerizable vinyl aromatic hydrocarbon is selected from the group consisting of styrene, α- and β-methylstyrenes, o-, m- and p-vinyltoluenes, o-, m- and p-isopropenyl toluenes, and mixtures of these.

8. The composition of claim 1 wherein the cationically polymerizable unsaturated aliphatic hydrocarbon is selected from the group consisting of butadiene, isoprene, piperylene, isobutylene, 2-butene, 2-methyl-1-butene, 2-methyl-2-butene, 1-pentene, 2-pentene, cyclopentene, and mixtures of these.

9. The composition of claim 1 wherein the cationically polymerizable unsaturated aliphatic hydrocarbon is mixed with any one of ingredients (a) to (d) in an amount of at most 80% by weight based on the weight of any one of the ingredients (a) to (d).

10. The composition of claim 1 wherein the high-boiling product has an oxygen content of 1 to 17% by weight.

11. The composition of claim 1 wherein the high-boiling product has a hydroxyl value of at least 10 mg KOH/g.

12. The composition of claim 1 wherein the high-boiling product has a hydroxyl value of 20 to 500 mg KOH/g.

13. The composition of claim 1 wherein the benzene ring-substituted with at least one isopropyl group is cumene, cymene or diisopropylbenzene, and the corresponding phenol is phenol, cresol or dihydroxybenzene.

14. The composition of claim 1 wherein the amount of the high-boiling product introduced is 5 to 200 parts by weight per 100 parts by weight of all the cationically polymerizable ingredients in the polymerizable material.

15. The composition of claim 1 wherein the amount of the high-boiling product introduced is 10 to 100 parts by weight per 100 parts by weight of all the cationically polymerizable ingredients in the polymerizable material.

16. The composition of claim 1 wherein the high-boiling product is introduced into the polymerization system before the initiation of the polymerization.

17. The composition of claim 1 wherein the cationic polymerization catalyst is a Friedel-Crafts catalyst.

18. The composition of claim 1 wherein the cationic polymerizable catalyst is boron trifluoride, a boron trifluoride complex, or aluminum trichloride.

19. The composition of claim 1 wherein the polymerization is carried out at a temperature of 0° to 200° C.

20. The composition of claim 1 wherein the polymer is liquid at room temperature, or solid with a softening point of not more than 200° C.

21. The composition of claim 1 wherein the polymer has an oxygen content of 0.5 to 15% by weight.

22. The composition of claim 1 wherein the polymer has a hydroxyl value of at least 1 mg KOH/g.

23. The composition of claim 1 wherein the polymer has a hydroxyl value of 1 to 400 mg KOH/g.

24. The composition of claim 1 wherein the polyepoxy compound has an epoxy equivalent of at most 5,000.

25. The composition of claim 1 wherein the polyepoxy compound has a molecular weight of 150 to 5,000.

26. The composition of claim 1 wherein the polyepoxy compound is selected from the group consisting of polyglycidyl ethers of polyphenol compounds and novolac-type polyepoxy compounds.

27. The composition of claim 1 wherein the amount of the novel polymer [A] is 5 to 1,500 parts by weight per 100 parts by weight of the polyepoxy compound [B].

28. The composition of claim 1 wherein the curing agent is a polyfunctional compound containing at least two functional groups selected from primary and secondary amino groups, acid anhydride groups, a mercapto group and a phenolic hydroxyl group.

29. The composition of claim 1 wherein the amount of the curing agent [C] is 0.2 to 200 parts by weight per 100 parts by weight of the sum of the novel polymer [A] and the polyepoxy compound [B].

30. The composition of claim 1 wherein the high-boiling product contains up to 10% by weight of said phenol or naphthol.

31. The composition of claim 1 wherein the high-boiling product contains up to 5% by weight of said phenol or naphthol.

* * * * *